(12) United States Patent
Skinner

(10) Patent No.: US 7,133,356 B2
(45) Date of Patent: Nov. 7, 2006

(54) METHOD AND APPARATUS FOR REDUCING EMI EMISSIONS

(75) Inventor: Harry G. Skinner, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 955 days.

(21) Appl. No.: 09/916,039

(22) Filed: Jul. 25, 2001

(65) Prior Publication Data

US 2003/0072387 A1 Apr. 17, 2003

Related U.S. Application Data

(63) Continuation of application No. 09/179,915, filed on Oct. 27, 1998, now abandoned.

(51) Int. Cl.
  *G06F 11/00* (2006.01)
  *H04J 3/22* (2006.01)

(52) U.S. Cl. ............... 370/216; 370/467; 370/545; 375/130

(58) Field of Classification Search ............... 370/545, 370/465, 216, 335, 342, 347, 467, 468; 375/130, 375/270, 362
  See application file for complete search history.

(56) References Cited

U.S. PATENT DOCUMENTS 3,798,544 A    3/1974  Norman
5,422,919 A    6/1995  Graham
5,612,956 A *  3/1997  Walker et al. ............... 370/545
5,731,728 A *  3/1998  Greiss ......................... 327/299
5,889,819 A *  3/1999  Arnett ......................... 375/270
6,026,124 A *  2/2000  Lee et al. .................... 375/292
6,144,242 A * 11/2000  Jeong et al. ................. 327/269

FOREIGN PATENT DOCUMENTS

EP     0823801 A2     2/1998
WO     WO 99-38281    7/1999

OTHER PUBLICATIONS

Bolger et al. Use Spread-Spectrum Techniques to Reduce EMI, EDN-Design Feature, May 21, 1998, pp. 141-148, XP-000846639.

* cited by examiner

*Primary Examiner*—Afsar Qureshi
(74) *Attorney, Agent, or Firm*—Paul E. Steiner

(57) ABSTRACT

Briefly, in accordance with one embodiment, a circuit to encode binary digital signals so as to reduce EMI emissions during signal transmission across a bus or interconnect includes circuitry to apply a pseudo-random pattern of binary digital signals to encode selected binary digital signals so as to reduce the harmonic content of the selected binary digital signals.

Briefly, in accordance with another embodiment, a method of encoding binary digital signals so as to reduce EMI emissions during signal transmission across a bus or interconnect includes applying a pseudo-random pattern of binary digital signals to encode selected binary digital signals so as to reduce the harmonic content of the selected binary digital signals.

38 Claims, 4 Drawing Sheets

DATA STREAM AFTER INV BIT ENCODING

0111011100010000000010000    DATA0

⋮

0111011100010000000010000    DATA23

1011000111010110010101110    INV_BIT (ADDITIONAL BIT)

FIG. 3

METHOD AND APPARATUS FOR REDUCING EMI EMISSIONS

This is a Continuation Patent Application of U.S. patent application Ser. No. 09/179,915, filed Oct. 27, 1998 now abandoned, titled, "Method and Apparatus for Reducing EMI Emissions," by Harry G. Skinner, assigned to the assignee of the present invention and herein incorporated by reference.

BACKGROUND

1. Field

The present invention relates to reducing EMI emissions, and more particularly, to circuitry for encoding signals so as to reduce EMI emissions.

2. Background Information

It is well-known that regular bit patterns or binary digital signal patterns in electronic devices, such as computers or personal computers, increase the levels of electromagnetic (EMI) emissions. One example of this phenomenon is the EMI emissions produced by clocks employed in digital circuitry, such as may be employed in a personal computer, for example. As a method of ensuring consistency of EMI measurement for video signals/interfaces, the Federal Communications Commission (FCC) has defined the use of a scrolling "H" pattern when doing compliance testing for EMI emissions. Unfortunately, the use of a scrolling "H" pattern generally increases the EMI emission levels and, furthermore, digital video interface EMI emission levels are more noticeably affected by this scrolling "H" pattern than, for example, analog video interfaces. For example, up to 24 individual traces may be employed in such a digital video interface, where 24 bits indicating color, for example, are employed. Of course, this problem is not limited to a 24 bit interface. A need, therefore, exists for a method or technique of reducing EMI emissions, particularly in digital video interfaces, such as when the signals are being transmitted across a signal bus or interconnect, or between two components, or between a component and display, for example.

SUMMARY

Briefly, in accordance with one embodiment of the invention, a circuit to encode binary digital signals so as to reduce EMI emissions during transmission across a bus includes: circuitry to generate a pseudo-random pattern of binary digital signals, and circuitry to apply logic operations to selected binary digital signals to be encoded and selected binary digital signals of the pseudo-random pattern.

Briefly, in accordance with another embodiment of the invention, a method of encoding binary digital signals so as to reduce EMI emissions during transmission across a bus includes the following. A pseudo-random pattern of binary digital signals is generated. Logic operations are applied to selected binary digital signals to be encoded and selected binary digital signals of the pseudo-random pattern.

Briefly, in accordance with one more embodiment of the invention, a circuit to decode binary digital signals that have been encoded so as to reduce EMI emissions during transmission across a bus includes: circuitry to apply logic operations to selected, encoded binary digital signals to be decoded and selected binary digital signals of a pseudo-random pattern employed to encode the encoded binary digital signals.

Briefly, in accordance with still one more embodiment of the invention, a method of decoding binary digital signals that have been encoded so as to reduce EMI emissions during transmission across a bus includes the following. Logic operations are applied to selected encoded binary digital signals to be decoded and selected binary digital signals of a pseudo-random pattern employed to encode the encoded binary digital signals.

Briefly, in accordance with yet still another embodiment, a circuit to encode binary digital signals so as to reduce EMI emissions during signal transmission across a bus or interconnect includes circuitry to apply a pseudo-random pattern of binary digital signals to encode selected binary digital signals so as to reduce the harmonic content of the selected binary digital signals.

Briefly, in accordance with yet still another embodiment, a method of encoding binary digital signals so as to reduce EMI emissions during signal transmission across a bus or interconnect includes applying a pseudo-random pattern of binary digital signals to encode selected binary digital signals so as to reduce the harmonic content of the selected binary digital signals.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 is a diagram illustrating a data stream, after encoding, that may be produced by an embodiment in accordance with the invention.

DETAILED DESCRIPTION

Figure 1:
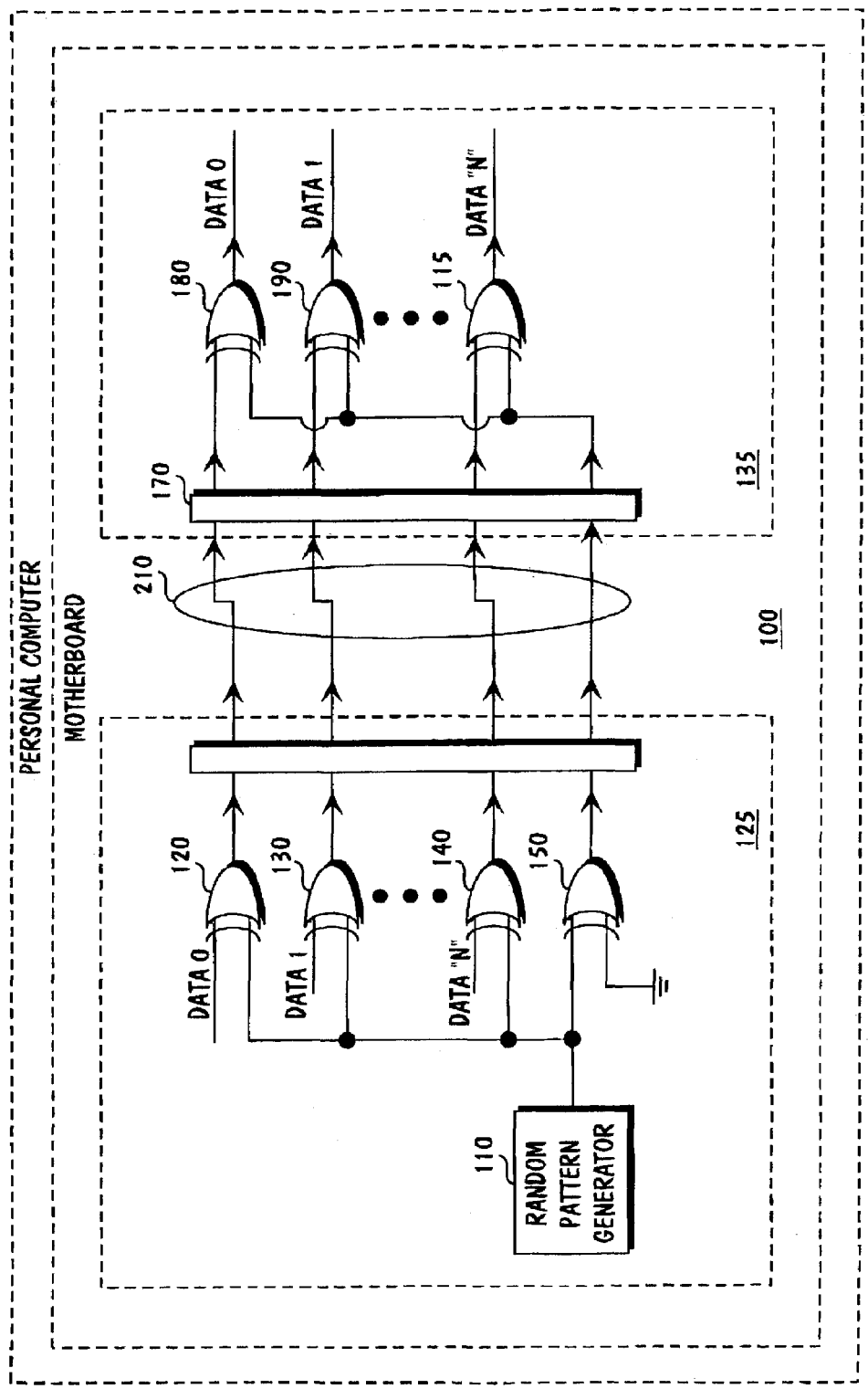
FIG. 1 is a circuit diagram illustrating an embodiment of a circuit for encoding binary digital signals so as to reduce EMI emissions in accordance with the present invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

As previously described, it is well-known that regular bit patterns of binary digital signals in electronic devices including, for example, computers or personal computers, results in higher levels of EMI emissions. In this context, the term "regular" refers to bit patterns or signal patterns that are repetitive. Again, as previously described, an example of this in digital electronic circuitry includes clocks or clock pulses, which produce regularly timed digital signal pulses for the purposes of accomplishing timing in the circuit or in a system, such as a computer. For the purposes of testing such devices for compliance with standards regarding EMI emissions, the Federal Communications Commission (FCC) has defined the use of a scrolling "H" pattern in order to ensure some consistency in testing, particularly for video signals and related interfaces. Unfortunately, this scrolling "H" pattern generally results in an increase in EMI emissions and, furthermore, the emissions from digital video interfaces are more noticeable affected by the scrolling "H" pattern because such interfaces may include 24 individual traces, where, for example, 24 bits are employed, as opposed to, for example, an analog video interface, which may employ fewer separate signals. In this context, the term video interface refers to an interface producing signals that provide video color signal information and the term digital video interface refers to an interface that produces binary digital signals conveying this type of signal information. Of course, the invention is not limited in scope to digital video interfaces, as explained in more detail later.

Typically, such EMI emissions are associated with the transmission of signals, such as binary digital signals, across a bus interface, such as, for example a signal bus that may couple between a microprocessor or CPU and a chipset that may include functionality to implement digital video capabilities, such as where such an interface operates at relatively high signaling speeds, such as, for example, 200 Mhz, although the invention is not limited in scope in this respect. The pattern employed by the FCC, the scrolling "H" pattern, results in signals that resemble multiple clock traces and, therefore, may produce undesirably high levels of EMI emissions. One approach employed by an embodiment in accordance with the present invention is to encode the binary digital signals so that the "regularity" of a "H" pattern is not reflected in the signaling that occurs between the microprocessor and the chipset, for example, in this particular embodiment.

Figure 2:
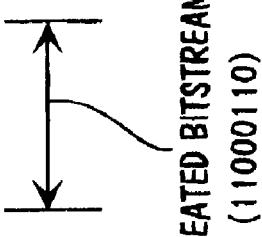
FIG. 2 is a table illustrating a typical data stream associated with a scrolling "H" pattern.

FIG. 1 is a circuit diagram illustrating one embodiment in accordance with the present invention. FIG. 2 is a table illustrating a typical data stream associated with a scrolling "H" pattern and FIG. 3 is a data stream after encoding for one embodiment in accordance with the present invention.

Embodiment 100 in FIG. 1 comprises a circuit to encode binary digital signals so as to reduce EMI emissions during transmission across a bus. Circuits 125 and 135 may be embodied on integrated circuit chips, such as those residing on a motherboard incorporated in a personal computer, although the invention is not limited in scope in this respect. As illustrated, the circuit includes circuitry 110 to generate a pseudo-random pattern of binary digital signals. Likewise, the circuit includes circuitry to implement logic, such as exclusive OR gates 120, 130, 140, and 150, to apply logic operations, such as exclusive OR operations, to selected binary digital signals to be encoded with selected binary digital signals of the pseudo-random pattern. Therefore, in this particular embodiment, for each exclusive OR gate shown in FIG. 1, a selected binary digital signal to be encoded, such as DATA0, DATA1, and so on, is applied to a particular gate and a selected binary digital signal of the pseudo-random pattern generated by generator 110 is likewise applied. Of course, the invention is not limited in scope to the particular structure illustrated in FIG. 1. For example, it is not necessary that exclusive OR gates be employed in order to implement the desired operations. Other forms of logic may likewise be employed if desired. For example, a look-up table may be employed, or software operating on a general or special purpose processor may be employed. In general, any technique in hardware, software, or any combination thereof, may be employed in order to accomplish the desired result. In addition, the logic operations to be implemented are not limited to exclusive OR operations. For example, an exclusive NOR logical operation might be implemented instead. Furthermore, in this particular embodiment, although, again, the invention is not limited in scope in this respect, if the random pattern generator 110 generates a random binary digital signal, such as a 1 or a 0, that particular binary digital signal is applied in order to encode each of the binary digital signals to be encoded such as DATA0, DATA1 and so on. For example, referring to FIG. 1, if a one-bit is produced by random pattern generator 110, then, in this embodiment, that bit is applied to gates 120, 130, 140 and 150 in parallel as the particular binary digital signals to be encoded are likewise applied to the other input port of those gates. The operation of this particular embodiment on a stream of binary digital signals may be understood by referring to FIG. 2 and FIG. 3.

FIG. 2 illustrates a typical data stream associated with a "H" pattern. Thus, a bit stream, in this example the bit stream 11000110, is repeated. This produces traces or streams of binary digital signals, designated DATA0 through DATA23 in this particular embodiment. Therefore, at each time instant that depends upon the particular embodiment, 24 streams of binary digital signals are being transmitted between a microprocessor and a chipset, for example, in this particular embodiment. For example, referring to the left-hand side of FIG. 2, DATA0 comprises a one in this first instance, DATA1 comprises a one in this first instance, DATA22 comprises a one in this first instance, and DATA23 comprises a one in this first instance. Therefore, substantially simultaneously these binary digital signals are all transmitted across a signal bus that has a sufficient "width" to transmit 24 streams of binary digital signals. However, the invention is not limited to 25 bits or to any particular number of bits. For example, 1 bit, 32 bits, or 64 bits may be employed, although, again, these are provided merely as examples.

Referring now to FIG. 3, at each instance, a random pattern generator or pseudo-random number generator, generates a stream of random binary digital signals(in this context, the terms "random" and "pseudo-random" are used interchangeably). Therefore, at each instance, randomly a 1 or a 0 logic signal is produced. As illustrated in FIG. 1, this binary digital signal produced by generator 110 is then applied substantially simultaneously to gates 120, 130, 140, and 150. Substantially simultaneously, the binary digital signals previously described, such as DATA0, DATA1, DATA22, and DATA23, are likewise applied to the appropriate gates. Because in this particular embodiment, these gates are exclusive OR gates, the effect of this is to implement the following operation. If the random pattern generator generates a one binary or logic signal, then the binary digital signals being applied or transmitted across the bus are inverted. However, if instead, the random number generated produces a zero binary or logic signal, then the binary digital signal is being transmitted across the bus as DATA0, DATA1, DATA22, and DATA23, for example, is not changed. Of course, in other embodiments, other operations may be implemented. For example, the bits being transmitted may alternatively be inverted on the occurrence of a randomly generated zero binary signal. Therefore, for this particular embodiment, the streams or signals illustrated in FIG. 3 are produced and transmitted from circuit 125 to circuit 135 in FIG. 1. It is noted, but not illustrated in detail that output buffers 160 are employed on the transmitting side and input buffers 170 are employed on the receiving side to assist in signal transmission.

By randomizing the binary digital signals for transmission across a signal bus, as previously described, the electromagnetic interference emissions typically associated with a scrolling "H" pattern are reduced. A reason this occurs is because the harmonic content of the signals has been reduced by making it nonregular, and, in this case, pseudo-random. In general, the amplitude of the harmonics of a signal that is repetitive falls off less quickly than a nonregular signal. This may be observed, for example, by examining the frequency spectrum of such signals. By randomizing the signal, and, therefore, making it nonregular, the harmonic content has been reduced, which reduces the EMI emissions when these signals, after they have been encoded, are transmitted across a signal bus or interconnect. An embodiment in accordance with the present invention, therefore, may be employed to reduce the EMI emissions of any "regular" signal pattern, such as, for example, a digital clock signal.

Of course, these binary digital signals transmitted should likewise be decoded once they are received. FIG. 1 likewise illustrates a circuit to decode binary digital signals that have been encoded so as to reduce the EMI emissions during transmission across the bus. As illustrated, in this embodiment, this circuit includes circuitry, such as gates 180, 190, and 115, to apply logic operations, such as exclusive OR operations, to selected encoded binary digital signals to be decoded with selected binary digital signals of a pseudo-random pattern employed to encode the encoded binary digital signals. More specifically, as illustrated in FIG. 1, in this embodiment, the random pattern of binary digital signals that has been produced by generator 110 is transmitted across the signal bus or interconnect along with the encoded binary digital signals. Therefore, these pseudo-random binary digital signals are then applied, in this embodiment, to exclusive OR gates 180, 190, and 115 in order to decode the encoded binary digital signals. This is illustrated in FIG. 1 in which the received encoded binary digital signals are applied synchronously with the associated random binary digital signal. As a result, the binary digital signal is then decoded and may be employed as desired, once it is decoded, having been received.

In this particular embodiment, the encoding is illustrated as being applied immediately before transmission across a signal bus, such as signal bus 210 illustrated in FIG. 1. However, the invention is not restricted in scope in this respect. However, if, for example, the encoding were to be applied earlier it may desirable to implement appropriate clock gate delays in order to ensure that the desired synchronous transmission and reception, previously described for this particular embodiment, is successfully accomplished. For example, for the circuit illustrated in FIG. 1, gate 150 includes a delay element in order to ensure that the output signals produced by gate 150 are properly synchronized with the output signals produced by the remaining gates, which also receive the random binary digital signal produced by generator 110 as an input signal. By carrying out this encoding, the "regularity" of a data display may not be reflected in data signals transmitted across the data bus between the components. This reduces the risk of increased EMI emissions, such as may be associated with the use of such a digital video interface, in this particular embodiment, for example.

Figure 4:
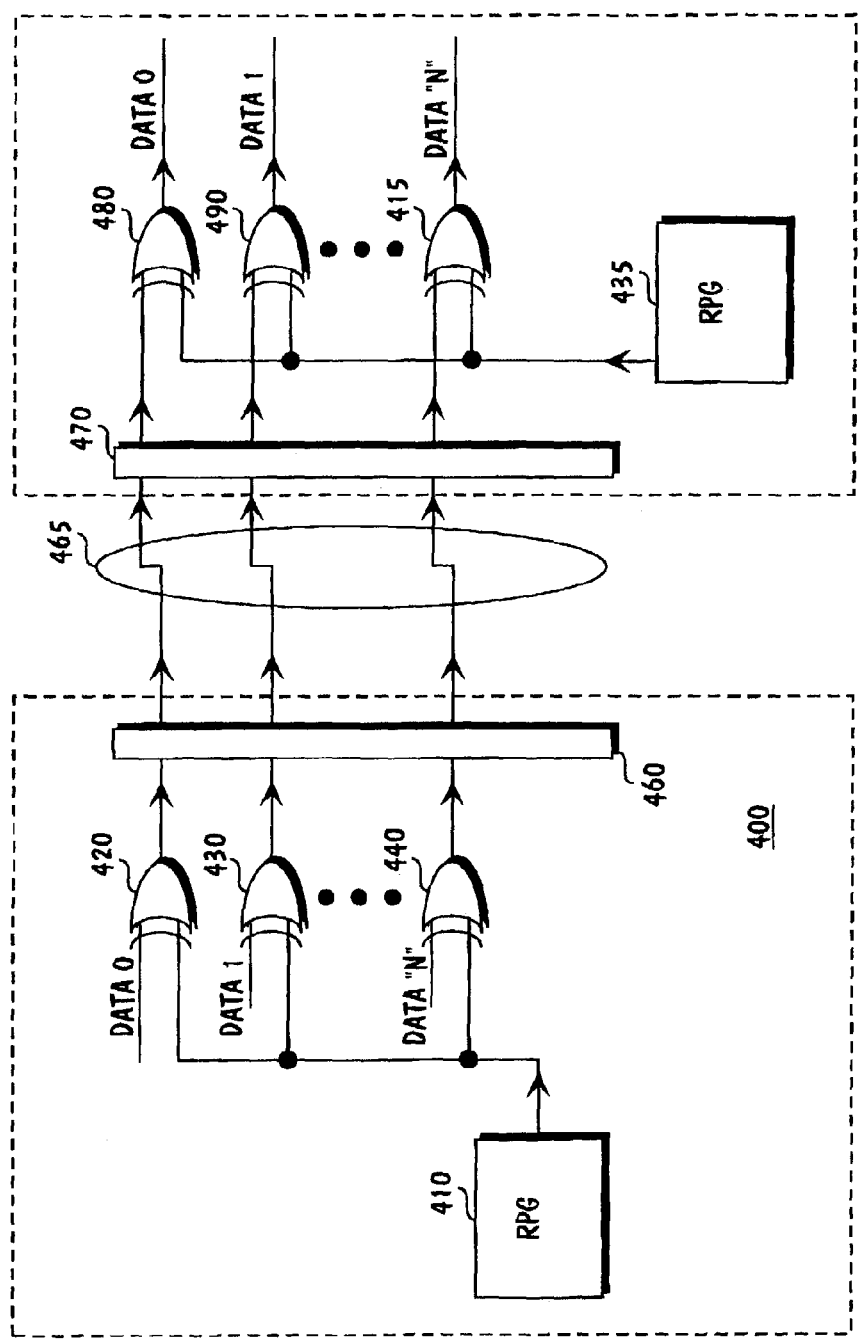
FIG. 4 is a circuit diagram illustrating another embodiment of a circuit for encoding binary digital signals so as to reduce EMI emissions in accordance with the present invention.

FIG. 4 illustrates another embodiment in accordance with the invention. This embodiment operates in a manner similar to the embodiment illustrated in FIG. 1 and previously described; however, here the binary digital signal or bit used to randomize the data signals being transmitted is not itself being transmitted. Instead, in this particular embodiment, as illustrated in FIG. 4, a separate random pattern generator (RPG) is employed on the receiving side of the bus or interconnect. RPG 435 is designed to produce the same pseudo-random pattern as RPG 410. Therefore, the two RPGs are, in this embodiment, synchronized so that they will produce the same, corresponding pseudo-random bits. Synchronization may be accomplished by any one of a number of methods. For example, the application of power and initial transmission and receipt of signals may result in synchronization.

In another alternative embodiment, a similar method might be employed to reduce the radiation associated with clocks, such as may be employed in digital circuitry or in a computer or personal computer. For example, the output signal produced by the clock could be, for example, exclusive OR-ed or exclusive NOR-ed with the output signal produced by a random number generator, thus, randomizing the clock output signal, such as illustrated in FIG. 1, for example, which may result in reduction of radiated EMI. Therefore, the harmonic content of the clock signal may be reduced by this or a similar encoding technique, as previously described. Likewise, in still another embodiment, more than one RPG may be employed to randomize the data signals to be transmitted. Therefore, the invention is not restricted to the particular embodiments illustrated.

While certain features of the invention have been illustrated and described herein, many modifications, substitutions, changes and equivalents thereof will now occur to those skilled in the art. It is, therefore, to be understood that the appended claims are intended to cover all such modifications and changes as fall within the spirit of the invention.

The invention claimed is:

1. A circuit to encode binary digital signals so as to reduce EMI emissions during signal transmission across a bus or interconnect comprising:
   circuitry to generate a pseudo-random pattern of binary digital signals; and
   circuitry to apply logic operations to selected binary digital signals, the selected binary digital signals to be encoded prior to signal transmission across the bus or interconnect, with selected binary digital signals of the pseudo-random pattern in order to reduce the harmonic content of the selected binary digital signals to be encoded;
   wherein the binary digital signals comprise regular binary digital signals and wherein the bus or interconnect includes at least two separate selected binary digital signals to be encoded.

2. The circuit of claim 1, wherein the logic operations comprise one of a logical exclusive OR operation and a logical exclusive NOR operation.

3. The circuit of claim 1, wherein the regular binary digital signals comprise at least twenty four digital video interface signals.

4. The circuit of claim 1, wherein the regular binary digital signals comprise digital clock signals.

5. The circuit of claim 1, wherein the circuitry to generate a pseudo-random pattern of binary digital signals comprises more than one pseudo-random pattern generator to generate more than one pseudo-random pattern; and wherein the circuitry to apply logic operations comprises circuitry to apply logic operations to selected binary digital signals, the selected binary digital signals to be encoded prior to signal transmission across the bus or interconnect, with selected binary digital signals of the more than one pseudo-random patterns in order to reduce the harmonic content of the selected binary digital signals to be encoded.

6. The circuit of claim 1, wherein said circuit is embodied on a motherboard.

7. The circuit of claim 1, wherein said motherboard is embodied in a personal computer.

8. The circuit of claim 1, further comprising:
   circuitry to transmit the pseudo-random pattern of binary digital signals across the bus or interconnect along with the encoded binary digital signals.

9. The circuit of claim 8, further comprising:
   delay circuitry to synchronize transmission of the encoded binary digital signals with the transmission of the pseudo-random pattern of binary digital signals.

10. A method of encoding binary digital signals so as to reduce EMI emissions during signal transmission across a bus or interconnect comprising:
   generating a pseudo-random pattern of binary digital signals;
   applying logic operations to selected binary digital signals, the selected binary digital signals to be encoded prior to signal transmission across the bus or interconnect, with selected binary digital signals of the pseudo-random pattern in order to reduce the harmonic content of the selected binary digital signals to be encoded;
   wherein the binary digital signals comprise regular binary digital signals and wherein the bus or interconnect includes at least two separate selected binary digital signals to be encoded.

11. The method of claim 10, wherein the logic operations comprise one of a logical exclusive OR operation arid a logical exclusive NOR operation.

12. The method of claim 10, wherein the regular binary digital signals comprise at least twenty four digital video interface signals.

13. The method of claim 10, wherein the regular binary digital signals comprise digital clock signals.

14. The method of claim 10, wherein generating a pseudo-random pattern of binary digital signals comprises generating more than one pseudo-random pattern; and wherein applying logic operations comprises applying logic operations to selected binary digital signals, the selected binary digital signals to be encoded prior to signal transmission across the bus or interconnect, with selected binary digital signals of the more than one pseudo-random patterns m order to reduce the harmonic content of the selected binary digital signals to be encoded.

15. The method of claim 10, further comprising:
   transmitting the pseudo-random pattern of binary digital signals across the across the bus or interconnect along with the encoded binary digital signals.

16. The method of claim 15, further comprising:
   synchronizing the transmission of the encoded binary digital signals with the transmission of the pseudo-random pattern of binary digital signals.

17. A circuit to decode binary digital signals that have been encoded so as to reduce EMI emissions during signal transmission across a bus or interconnect comprising:
   circuitry to apply logic operations to selected encoded binary digital signals to be decoded, the encoded binary digital signals being encoded to reduce the harmonic content of the pre-encoded binary digital signals, with selected binary digital signals of a pseudo-random pattern used to encode the encoded binary digital signals;
   wherein the binary digital signals comprise regular binary digital signals and wherein the bus or interconnect includes at least two separate selected binary digital signals to be encoded.

18. The circuit of claim 17, wherein the logic operations comprise one of a logical exclusive OR operation and a logical exclusive NOR operation.

19. The circuit of claim 17, wherein the circuitry to apply logic operations includes circuitry to generate a pseudo-random pattern of binary digital signals.

20. The circuit of claim 19, wherein the circuitry to generate a pseudo-random pattern of binary digital signals comprises more than one pseudo-random pattern generator to generate more than one pseudo-random pattern; and wherein the circuitry to apply logic operations comprises circuitry to apply logic operations to selected binary digital signals, the selected binary digital signals to be encoded prior to signal transmission across the bus or interconnect, with selected binary digital signals of the more than one pseudo-random patterns in order to reduce the harmonic content of the selected binary digital signals to be encoded.

21. The circuit of claim 17, wherein said circuit is embodied on a motherboard.

22. The circuit of claim 17, wherein said motherboard is embodied in a personal computer.

23. A method of decoding binary digital signals that have been encoded so as to reduce EMI emissions during signal transmission across a bus or interconnect comprising:
   applying logic operations to selected encoded binary digital signals to be decoded, the encoded binary digital signals being encoded to reduce the harmonic content of the pre-encoded binary digital signals, with selected binary digital signals of a pseudo-random pattern used to encode the encoded binary digital signals;
   wherein the binary digital signals comprise regular binary digital signals and wherein the bus or interconnect includes at least two separate selected binary digital signals to be encoded.

24. The method of claim 23, wherein the logic operations comprise one of a logical exclusive OR operation and a logical exclusive NOR operation.

25. The method of claim 23, and further comprising, generating a pseudo-random pattern of binary digital signals.

26. The method of claim 23, wherein generating a pseudo-random pattern of binary digital signals comprises generating more than one pseudo-random pattern of binary digital signals; and wherein applying logic operations comprises applying logic operations to selected binary digital signals, the selected binary digital signals to be encoded prior to signal transmission across the bus or interconnect, with selected binary digital signals of the more than one pseudo-random patterns in order to reduce the harmonic content of the selected binary digital signals to be encoded.

27. A circuit to encode binary digital signals so as to reduce EMI emissions during signal transmission across a bus or interconnect comprising:
   circuitry to apply at least one pseudo-random pattern of binary digital signals to encode selected binary digital signals so as to reduce the harmonic content of the selected binary digital signals;
   wherein the binary digital signals comprise regular binary digital signals and wherein the bus or interconnect includes at least two separate selected binary digital signals to be encoded.

28. The circuit of claim 27, wherein the regular binary digital signals comprise video at least twenty four digital video interface signals.

29. The circuit of claim 27, wherein the regular binary digital signals comprise digital clock signals.

30. The circuit of claim 27, wherein said circuit is embodied on a motherboard.

31. The circuit of claim 27, wherein said motherboard is embodied in a personal computer.

32. The circuit of claim 27, further comprising:
circuitry to transmit the pseudo-random pattern of binary digital signals across the bus or interconnect along with the encoded binary digital signals.

33. The circuit of claim 32, further comprising:
delay circuitry to synchronize transmission of the encoded binary digital signals with the transmission of the pseudo-random pattern of binary digital signals.

34. A method of encoding binary digital signals so as to reduce EMI emissions during signal transmission across a bus or interconnect comprising;
applying at least one pseudo-random pattern of binary digital signals to encode selected binary digital signals so as to reduce the harmonic content of the selected binary digital signals;
wherein the binary digital signals comprise regular binary digital signals and wherein the bus or interconnect includes at least two separate selected binary digital signals to be encoded.

35. The method of claim 34, wherein the regular binary digital signals comprise at least twenty four digital video interface signals.

36. The method of claim 34, wherein the regular binary digital signals comprise digital clock signals.

37. The method of claim 34, further comprising:
transmitting the pseudo-random pattern of binary digital signals across the across the bus or interconnect along with the encoded binary digital signals.

38. The method of claim 37, further comprising:
synchronizing the transmission of the encoded binary digital signals with the transmission of the pseudo-random pattern of binary digital signals.

* * * * *

UNITED STATES PATENT AND TRADEMARK OFFICE
CERTIFICATE OF CORRECTION

PATENT NO.        : 7,133,356 B2
APPLICATION NO.   : 09/916039
DATED             : November 7, 2006
INVENTOR(S)       : Skinner It is certified that error appears in the above-identified patent and that said Letters Patent is hereby corrected as shown below:

In column 7, at line 27, delete "arid" and insert --and--.
In column 7, at line 41, delete "m" insert --in--.

Signed and Sealed this

Fourth Day of September, 2007

JON W. DUDAS
*Director of the United States Patent and Trademark Office*